March 22, 1966 W. D. COCKRELL 3,242,410
CIRCUIT FOR CONTROLLING ENERGIZATION OF A DIRECT CURRENT LOAD
Filed April 26, 1962 2 Sheets-Sheet 1

INVENTOR.
WILLIAM D. COCKRELL
BY
*Robert R. Strack*
ATTORNEY

March 22, 1966     W. D. COCKRELL     3,242,410

CIRCUIT FOR CONTROLLING ENERGIZATION OF A DIRECT CURRENT LOAD

Filed April 26, 1962     2 Sheets-Sheet 2

INVENTOR.
WILLIAM D. COCKRELL
BY
Robert R. Strack
ATTORNEY

United States Patent Office 3,242,410
Patented Mar. 22, 1966

3,242,410
CIRCUIT FOR CONTROLLING ENERGIZATION OF A DIRECT CURRENT LOAD
William D. Cockrell, Waynesboro, Va., assignor to General Electric Company, a corporation of New York
Filed Apr. 26, 1962, Ser. No. 190,404
9 Claims. (Cl. 318—331)

This invention relates the control circuits for regulating the speed direct current motors, and particularly, to solid state control circuits for regulating the speed of direct current motors by controlling the power delivered to the armatures thereof.

The speed of a direct current motor is a function of the applied armature voltage, the field strength, and the voltage drop caused by current flow through the armature resistance. In view of this relationship, it is common practice to control motor speed by applying a constant field and providing means for automatically varying the armature supply in response to changes in speed in order to provide the power required to return the speed to some desired value. A large number of circuits have been developed wherein gating devices are inserted in series between the armature and a source of supply. These gating devices effectively provide for connection of the supply to the armature for selected periods of time in accordance with the power required to maintain the speed constant. The duration of power application, or the "width" of the applied pulse of power, directly determines the speed of the motor.

With constant field strength, the motor acts as a generator when power is not applied to the armature and develops a voltage that is proportional to its speed. Thus, when using pulse width control over the armature supply, the armature voltage during the "off" portion of the supply cycle provides a direct indication of motor speed. Regulating circuits utilize the counter E.M.F. or armature voltage, in conjunction with a controlled magnitude direct voltage to establish the operating cycle of the aforementioned gating devices to yield a desired motor speed.

An object of the invention is to provide improved circuits for speed control of direct current motors operating from alternating current sources and responsive to armature counter E.M.F.

Both thyratrons and silicon controlled rectifiers have been employed as the gating devices mentioned above. These elements are inserted in series with the armature and are triggered into conduction in accordance with the desired operating conditions. An important characteristic of circuits using such elements, is the speed of response to a triggering impuse. When rapid response is available, minute changes in speed may be used to effect minute changes in the duration of conduction and consequently afford good speed regulation. Controlled rectifiers of the solid state variety have become increasingly popular because of their rapid response characteristics and their extreme small size and light weight. They are particularly appealing in conjunction with small motor control circuits where size and weight are important factors.

Another object of the invention is to provide improved motor control circuits using silicon controlled rectifiers.

The obtain the advantages offered by the rapid response of silicon controlled rectifiers, the circuitry employed to convert the armature and control voltages into a triggering pulse therefor, which is properly placed in time to yield the desired application of power, must be designed with regard for their rapid switching characteristics. A sharp rise time, for instance, is required. In the past, self-saturating magnetic amplifiers have offered one form of trigger pulse generating circuitry yielding well-shaped and accurately positioned pulses. However, the advantages of weight elimination inherent in the use of silicon controlled rectifiers are largely lost when saturable devices are used in conjunction therewith. It is desirable to provide a light weight triggering control circuit which yields well-shaped and accurately positioned pulses in accordance with the speed requirements of a motor.

Thus, another object of the invention is to provide an improved direct current control circuit using side state controlled rectifiers in series with the armature and controlled by solid state pulse generating circuitry.

In accordance with several illustrative embodiments of the invention, unique regulating circuits are developed wherein a silicon controlled rectifier is serially connected with the armature of a constant field motor across an alternating current source. A transistor is suitably connected to supply triggering pulses to the gate electrode of the controlled rectifier at a time jointly determined by the armature voltage and a controllable direct current speed regulating voltage. Changes in motor speed are effective to alter the instant of application of the triggering pulses and thus alter the amount of power applied through the controlled rectifier to the armature.

The novel features of the invention are set forth with particularity in the appended claims. The invention itself, however, both as to its organization and method of operation, together with further objects and features thereof, may best be understood by reference to the following description taken in conjunction with the accompanying drawings wherein:

Figure 2:
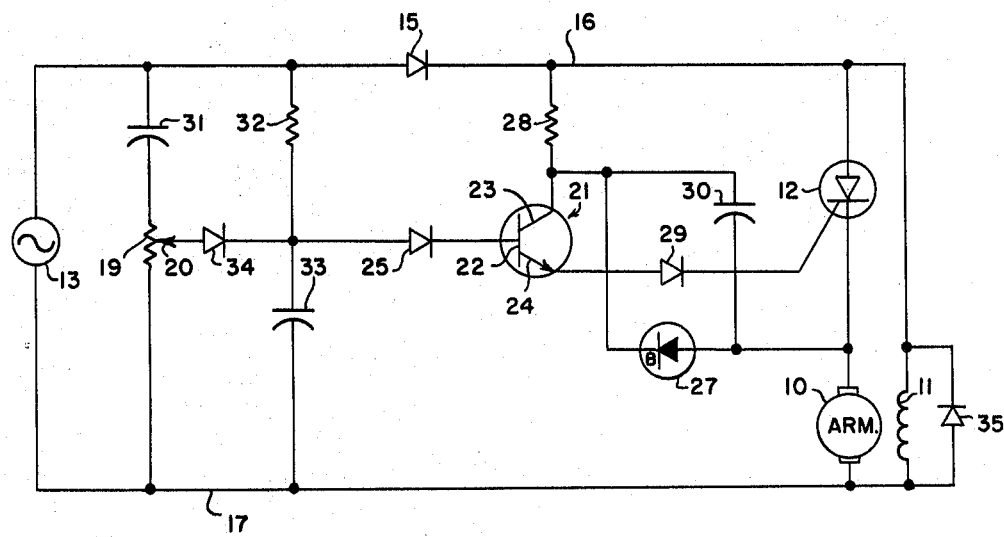
FIG. 2 is a circuit schematic of a second embodiment of the invention, illustrating a control circuit for a shunt wound direct current motor having a continuously energized field and a speed regulating voltage that is out of phase with the supply voltage.
Figure 3:
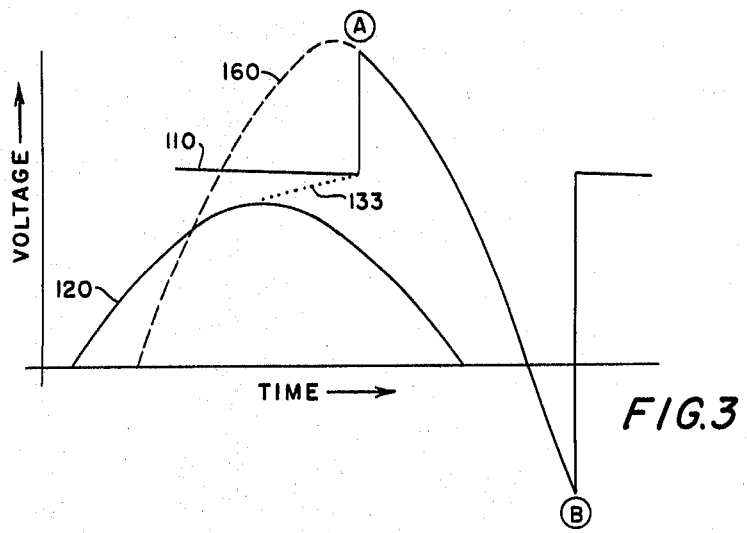
Figure 4:
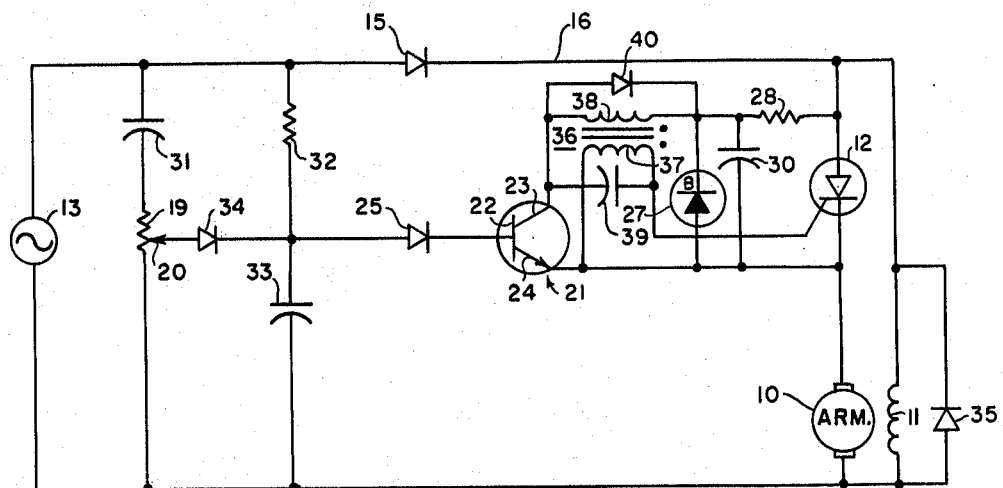

FIG. 3 contains a plurality of waveforms illustrating the typical operation of a control system in accordance with the invention; and FIG. 4 is a circuit schematic of a third embodiment of the invention, illustrating a control circuit similar to that of FIG. 2, but including a feedback circuit to improve the shape of the triggering pulses for the controlled rectifier.

Figure 1:
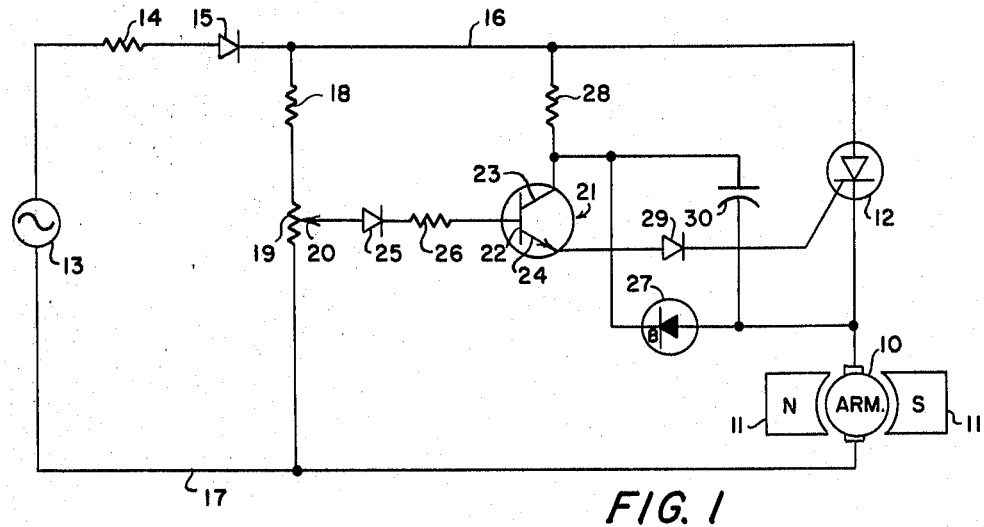
FIG. 1 is circuit schematic of a first embodiment of the invention, illustating a control circuit for a permanent field direct current current motor.

The permanent field motor in FIG. 1 is illustrated by an armature 10 disposed between pemanent magnets 11. Armature 10 is serially connected with a controlled rectifier 12 between supply conductors 16 and 17. A half wave rectified single phase voltage is applied to conductors 16 and 17 by an alternating current source 13 in series with a current limiting resistor 14 and a conventional rectifier 15. Rectifier 15 is oriented with the same polarization as controlled rectifier 12 and, when the latter is rendered conductive during a positive half cycle from source 13, a positive pulse of current is applied to the armature 10 in the circuit comprising the upper terminal of voltage source 13, resistor 14, rectifier 15, conductor 16, controlled rectifier 12, armature 10, conductor 17, and the lower terminal of voltage source 13.

The conduction of controlled rectifier 12 is jointly determined by the armature voltage on the upper terminal of armature 10 and the position of sliding contact 20 associated with a speed control potentiometer 19. Potentiometer 19 is connected in series with a resistor 18 between conductors 16 and 17 and is therefore supplied by a half wave rectified direct voltage. Slider 20 is connected via a suitably oriented rectifier 25 and a resistor 26 to permit current flow to the base 22 of an NPN transistor 21. The collector 23 of transistor 21 is connected by a resistor 28 to positive supply conductor 16 and the emitter 24 thereof is connected by a suitably oriented rectifier 29 to permit application of a positive triggering pulse to the gate electrode of controlled rectifier 12. In view of these connections, transistor 21 is effective to supply a triggering pulse from conductor 16, in the path including the collector-emitter junction thereof and rectifier 29, when the biasing voltage on its base 22 is more positive than the voltage on its emitter 24.

To insure the generation of triggering pulses of desired proportions and to protect transistor 21 from excess voltage, a Zener diode 27 in parallel with a capacitor 30 interconnects the upper terminal of armature 10 and collector 23. Zener diode 27 is oriented to be reverse-biased during the application of the positive half cycle of power from source 13. Thus, at some point determined by its characteristics, Zener diode 27 breaks down and thereafter establishes a constant charge on capacitor 30 and a constant potential on collector 23 of transistor 21.

A consideration of a typical operating cycle will provide an appreciation of the function of each of the circuit elements.

Assume that the motor is running and that armature 10 is generating a counter E.M.F. As the line voltage increases during the positive half cycle of power from source 13, the anode of controlled rectifier 12 is subjected to a voltage which rises and ultimately becomes more positive than the counter E.M.F. which is applied to the cathode thereof. Simultaneously, capacitor 30 is charged positively on the upper plate in the circuit comprising conductor 16, resistor 28, armature 10, and conductor 17. At some voltage level, e.g., 12 volts, Zener diode 27 breaks down, fixing the voltage on the upper plate of capacitor 30 and on collector 23. During this time, base 22 of transistor 21 becomes increasingly positive in the circuit including conductor 16, the upper portion of potentiometer 19, slider 20, rectifier 25, and resistor 26. When the voltage on base 22 becomes more positive than the voltage of emitter 24, transistor 21 switches to a conducting state and provides a triggering pulse to the gate of controlled rectifier 12.

In response to the triggering pulse from transistor 21, controlled rectifier 12 is switched to a conductive state and the potential between its anode and cathode is reduced to a small value. Thus, power is applied directly to armature 10. At the same time, the shunting effect of the conducting controlled rectifier effectively removes the potential across transistor 21 and Zener 27 and causes them to stop conducting. It is important to note that the instant of firing of transistor 21 is determined by the voltage between base 22 and emitter 24. The base voltage is established by the setting of potentiometer 19 and the emitter voltage is established by the counter E.M.F. of armature 10. Obviously, if the slider 20 on potentiometer 19 is insufficiently positive, the voltage on base 22 will never exceed the voltage on emitter 24 and transistor 21 will not conduct, the controlled rectifier 12 will not transmit power to armature 10, and the motor will slow down, lowering the back E.M.F. The armature counter E.M.F. and speed are maintained at the peak voltage reached by the potential at the slider 20 of speed potentiometer 19.

FIG. 2 is a circuit schematic of a second illustrative embodiment of the invention. In this embodiment, phase shifting means have been added to the control circuitry in order to yield more satisfactory regulation. In general, the elements that both circuits have in common are identified by identical numerical designations. In FIG. 2 the reference voltage at slider 20 is an alternating voltage which leads the alternating voltage of source 13. This is developed by connecting potentiometer 19 in series with a capacitor 31, directly across source 13. A capacitor 33 is serially connected with a rectifier 34 between slider 20 and one terminal of source 13 in order to produce a positive biasing voltage for the base 22 of transistor 21. The junction between capacitor 33 and rectifier 34 is connected by rectifier 25 to base 22 and a large impedance resistor 32 connects the cited junction to the opposite terminal of source 13. It may also be noted that in FIG. 2, the motor has a shunt field 11 connected between conductors 16 and 17. A suitably oriented rectifier 35 furnishes the required low impedance path across field 11 during the "off" portion of the supply cycle.

Waveforms of several typical voltages in the circuit of FIG. 2 are illustrated in FIG. 3. Dashed waveform 160 represents the voltage on conductor 16. Solid waveform 120 represents the voltage at slider 20. Solid waveform 110 represents the voltage on the upper terminal of armature 10. And dotted waveform 133 represents the voltage on the upper plate of capacitor 33.

With commencement of a positive half cycle, capacitor 33 is charged in the circuit comprising the upper terminal of source 13, capacitor 31, the upper portion of potentiometer 19, slider 20, rectifier 34, conductor 17, and the lower terminal of source 13. As shown in FIG. 3, the capacitor voltage 133 follows the increasing voltage at slider 20 until it reaches a peak; thereafter, a slight additional charge is accumulated in the circuit including source 13 and high impedance resistor 32. Due to the orientation of rectifier 34 and the magnitude of resistor 32, the charge on capacitor 33 rises slightly during the remaining portion of the positive half cycle in excess of the back E.M.F. voltage until transistor 21 is rendered conductive and furnishes a low impedance discharge path.

Transistor 21 switches into conduction when the voltage (waveform 133) on its base equals the voltage (waveform 110) on its emitter; the latter voltage being determined by the armature counter E.M.F. as reflected through the cathode-gate junction of controlled rectifier 12 and conventional rectifier 29. Upon conduction of transistor 21, a sharply rising triggering pulse is applied to the gate electrode of controlled rectifier 12, switching it into conduction at time (A). Thereafter the armature voltage (waveform 110) follows the applied voltage (waveform 160) until it descends below zero. After this point, the inductive nature of the armature sustains current flow until a time (B) at which current ceases and the voltage returns abruptly to the value of the counter E.M.F. It will be understood that current flows in armature 10 for the portion of the cycle starting at time (A) and terminating at time (B).

Still another embodiment of the invention is shown in FIG. 4. Once again, elements similar to those in the other figures are designated by similar numerals. The difference between this circuit and that of FIG. 2 lies in the utilization of feedback transformer 36 having primary windings 37 connected between emitter 24 and the gate of controlled rectifier 12, and secondary windings 38 connected between collector 23 and resistor 28. The function of this feedback transformer is to provide a positive feedback from the emitter of transistor 21 to the collector thereof. Circuit operation is similar to that already considered, except that when transistor 21 is rendered conductive, the triggering current from emitter 24 is applied via primary winding 37 to the gate of controlled rectifier 12, and therefore induces a voltage in secondary 38 which increases the supply voltage at the collector 23.

As indicated by the conventional "dot" notation, the collector-emitter current in transistor 21 induces a voltage in the secondary windings 38 of feedback transformer 36 in a direction to enhance conduction of transistor 21. The cumulative effect of this feedback path is to greatly accelerate the switching of transistor 21 and thereby give considerably better rise time to the triggering pulse applied to the gate of controlled rectifier 12.

Three discrete embodiments of a motor control system using controlled rectifiers have been shown. Each of these embodiments utilize a solid state controlled rectifier in series with the armature and an alternating current source to control the amount of power applied thereto. A transistor switch controlled by a reference voltage and the counter E.M.F. of the armature functions as a pulse generating device to develop triggering pulses for the gate electrode of the solid state rectifier at appropriate times to stabilize the speed of the motor at a particular value determined by the reference voltage.

The described circuits constitute particular embodiments of the invention. It will, of course, be understood that it is not wished to be limited thereto since modifications can be made both in the circuit arrangements and in the instrumentalities employed and it is contemplated in the appended claims to cover any such modifications as fall within the true spirit and scope of the invention.

What is claimed as new and desired to be secured by Letters Patent of the United States is:

1. A direct current motor control system comprising, a source of alternating current, a controlled rectifier having anode, cathode, and gate electrodes and adapted to conduct in response to the application of a pulse between said gate and cathode electrodes, means for serially connecting said controlled rectifier with said source of alternating current and the armature of said motor, control means connected to said source of alternating current for establishing a voltage level commensurate with the desired operating speed of said motor, a normally nonconducting transistor having input, output, and common electrodes, means connecting said output and common electrodes across the cathode and gate electrodes of said controlled rectifier, and means connecting said input electrode to said control means to render said transistor conductive when said established voltage level exceeds the voltage on said armature by a predetermined amount.

2. A direct current motor control system comprising, a source of alternating current, a controlled rectifier having anode, cathode, and gate electrodes and adapted to conduct in response to the application of a pulse between said gate and cathode electrodes, means for serially connecting said controlled rectifier with said source of alternating current and the armature of said motor, control means connected to said source of alternating current for establishing a voltage level commensurate with the desired operating speed of said motor, energy storage means, means interconnecting said energy storage means and said source of alternating current for establishing a direct voltage charge thereon, a normally non-conducting transistor having input, output, and common electrodes, said transistor being operative to conduct when said established voltage level exceeds the voltage on said armature by a predetermined amount, and means serially connecting said energy storage means and said output and common electrodes across the gate and cathode electrodes of said controlled rectifier.

3. A direct current motor control system as defined in claim 2 in combination with means for limiting the direct voltage charge on said energy storage means to a predetermined amount.

4. In a system for controlling a direct current motor from an alternating current source, a controlled rectifier having anode, cathode, and gate electrodes and adapted to conduct in response to the application of a pulse between said gate and cathode electrodes, means for serially connecting said controlled rectifier and the armature of said motor across said alternating current source, control means connected to said alternating current source and adapted to produce a control voltage which leads the output from said alternating current source, a normally nonconducting transistor having input, output, and common electrodes, said transistor being operative to conduct when said control voltage exceeds the voltage on said armature by a predetermined amount, and means connecting said output and common electrodes across the cathode and gate electrodes of said controlled rectifier.

5. In a system for controlling a direct current motor from an alternating current source, a controlled rectifier having anode, cathode, and gate electrodes and adapted to conduct in response to the application of a pulse between said gate and cathode electrodes, means for serially connecting said controlled rectifier and the armature of said motor across said alternating current source, control means connected to said alternating current source and adapted to produce a control voltage which leads the output from said alternating current source, energy storage means, means interconnecting said energy storage means and said alternating current source for establishing a direct voltage charge thereon, a normally nonconducting transistor having input, output, and common electrodes, said transistor being operative to conduct when said control voltage exceeds the voltage on said armature by a predetermined amounts, and means serially connecting said energy storage means and said output and common electrodes across the cathode and gate electrodes of said controlled rectifier.

6. A system for controlling a direct current motor as defined in claim 5 in combination with means shunting said energy storage means and adapted to limit the direct voltage thereon to a predetermined amount.

7. A system for controlling a direct current motor as defined in claim 5 in combination with positive feedback means coupling the output electrode of said transistor to the common electrode thereof in order to enhance the conduction thereof.

8. A direct current motor control system comprising, a source of alternating current, a controlled rectifier having an anode, cathode and gate electrodes, the anode-cathode junction of said rectifier being connected in a series circuit with the armature of said motor and said source of current, said controlled rectifier being switchable to a conduction state in response to a signal applied to its gate electrode, means for establishing a first control signal having a level commensurate with the desired operating speed of said motor, means for developing a second control signal having a level commensurate with the actual speed of said motor, energy storage means, means for charging said energy storage means to a desired level, a normally nonconducting transistor, said transistor comprising base, emitter, and collector electrodes, means connecting said emitter-collector junction, said energy storage means and said gate electrode in series circuit, said transistor responsive to said first and second control signals to become conductive and discharge said energy storage means via said gate electrode when said first control signal level bears a predetermined relationship with respect to the level of said second signal.

9. A direct current motor control system as defined in claim 8 in combination with means connected to said energy storage means for limiting the charge thereon to a predetermined level.

References Cited by the Examiner
UNITED STATES PATENTS

| | | | |
|---|---|---|---|
| Re. 25,203 | 7/1962 | Momberg et al. | 318—345 |
| 2,376,169 | 5/1945 | Moyer | 318—331 |
| 2,552,206 | 5/1951 | Moyer | 318—331 |
| 3,024,401 | 3/1962 | Dinger | 318—345 |
| 3,064,174 | 11/1962 | Dinger | 318—345 |
| 3,082,366 | 3/1963 | Sanders | 318—345 |
| 3,095,534 | 6/1963 | Cockrell | 318—331 X |

MILTON O. HIRSHFIELD, *Primary Examiner.*